United States Patent [19]

Kaneda

[11] Patent Number: 5,249,010
[45] Date of Patent: Sep. 28, 1993

[54] APPARATUS FOR CONTROLLING A ZOOMING OPTICAL DEVICE

[75] Inventor: Naoya Kaneda, Yokohama, Japan

[73] Assignee: Canon Kabushiki Kaisha, Tokyo, Japan

[21] Appl. No.: 728,287

[22] Filed: Jul. 11, 1991

Related U.S. Application Data

[62] Division of Ser. No. 540,267, Jun. 19, 1990, Pat. No. 5,060,001.

[30] Foreign Application Priority Data

Jun. 23, 1989 [JP] Japan .................. 1-161303

[51] Int. Cl.$^5$ ............... G03B 5/00; G03B 13/36; G02B 7/10
[52] U.S. Cl. .................. 354/400; 354/195.1; 359/698
[58] Field of Search ............ 354/400, 195.1, 195.12; 359/684, 696–698

[56] References Cited

U.S. PATENT DOCUMENTS

4,920,369  4/1990  Kaneda et al. ............ 354/400
4,950,054  8/1990  Wada et al. ............... 354/400
4,975,724  12/1990  Hirasawa et al. .......... 354/400

FOREIGN PATENT DOCUMENTS

60-143310  7/1985  Japan .
64-051726  2/1989  Japan .

Primary Examiner—W. B. Perkey
Attorney, Agent, or Firm—Fitzpatrick, Cella, Harper & Scinto

[57] ABSTRACT

An optical apparatus comprises a first lens for effecting magnification change, a second lens provided more adjacent to the focal plane than the first lens for effecting focusing and correction during the magnification change, driving means for moving the first and second lenses along the optic axis thereof, detecting means for detecting the positions of the first and second lenses, and control means for controlling the second lens so as not to move to an area in which continuous in-focus cannot be maintained to an object at a close distance, during the movement of the first lens from the telephoto to the wide end.

12 Claims, 11 Drawing Sheets

| FIG. 3A | FIG. 3B |

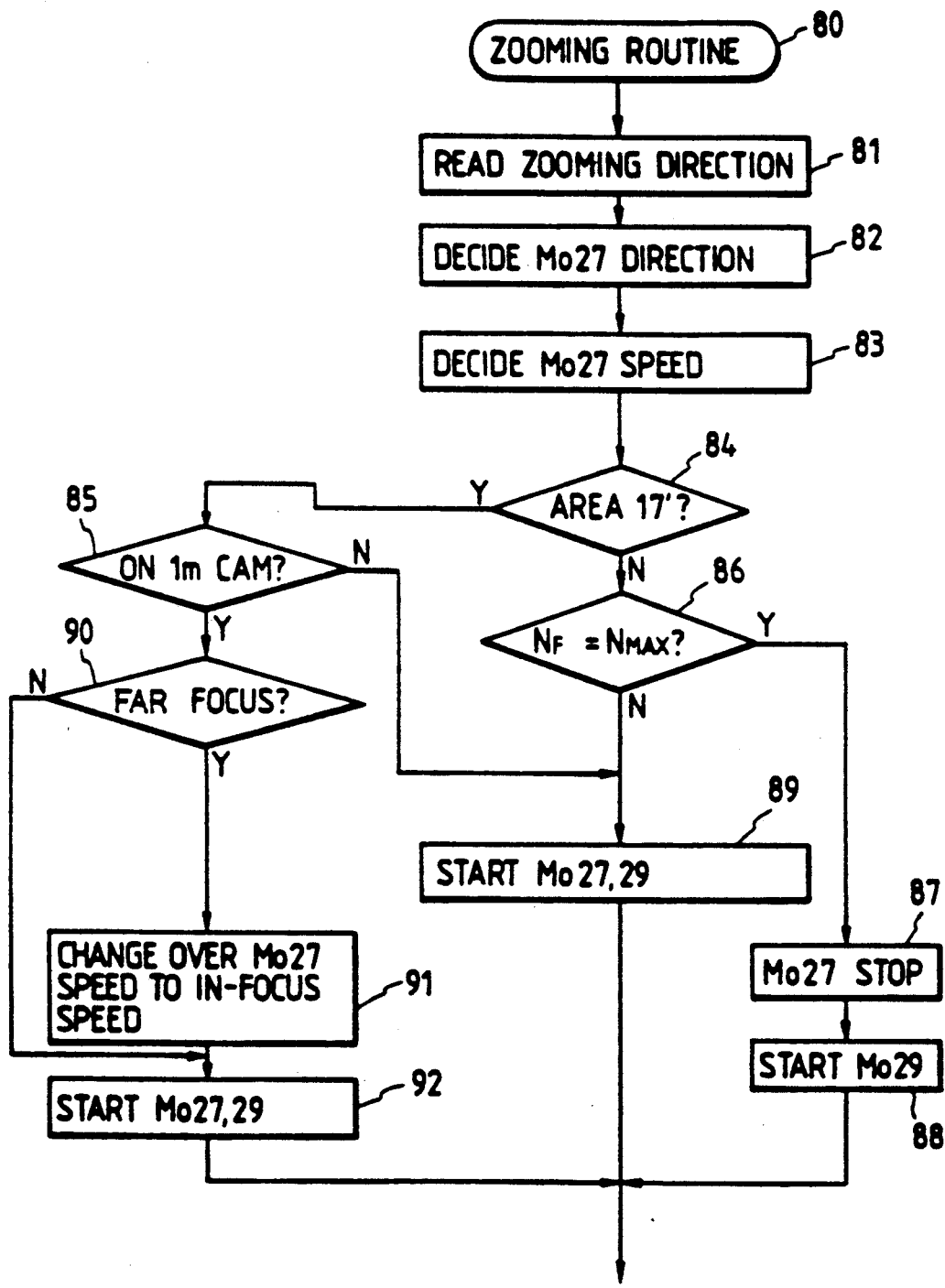

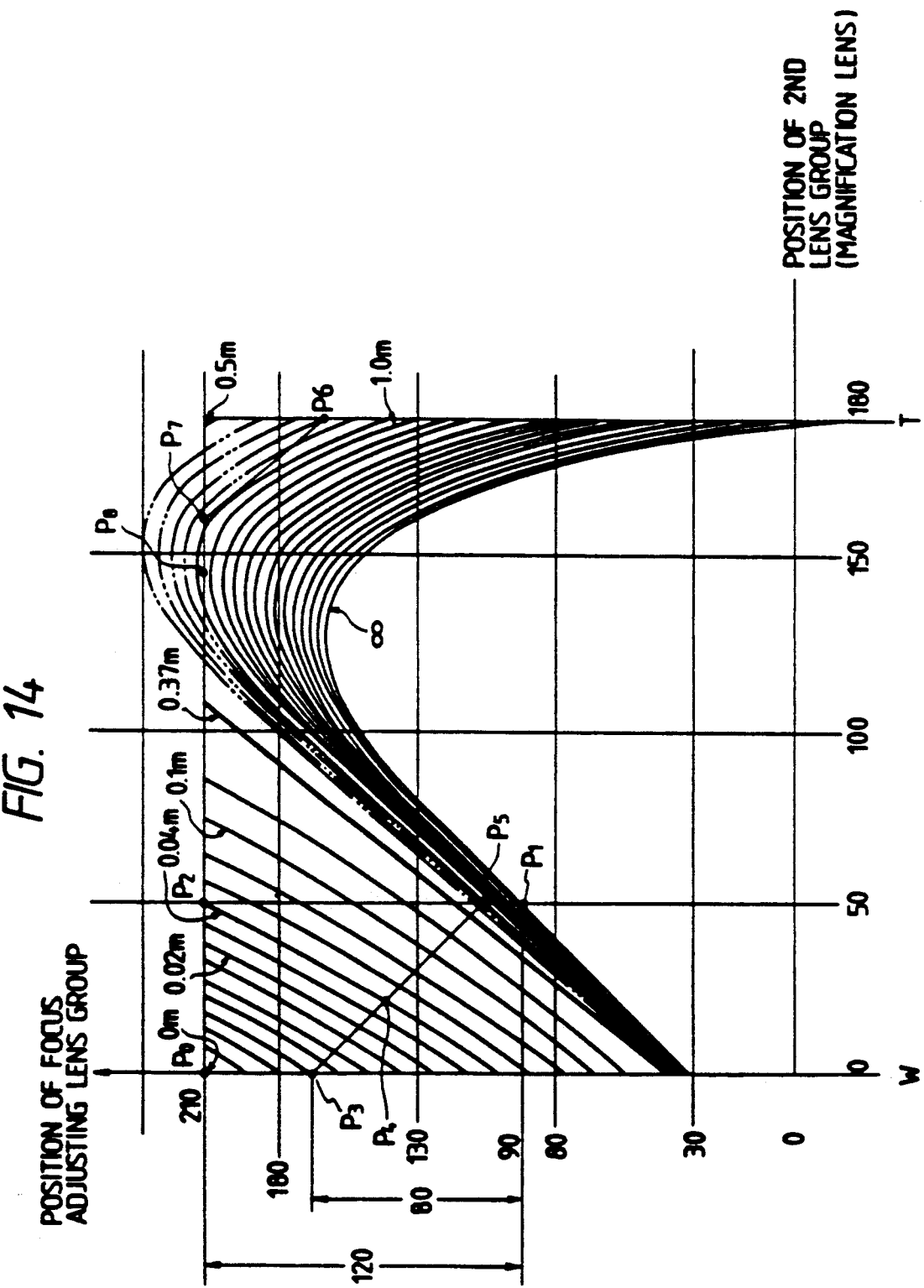

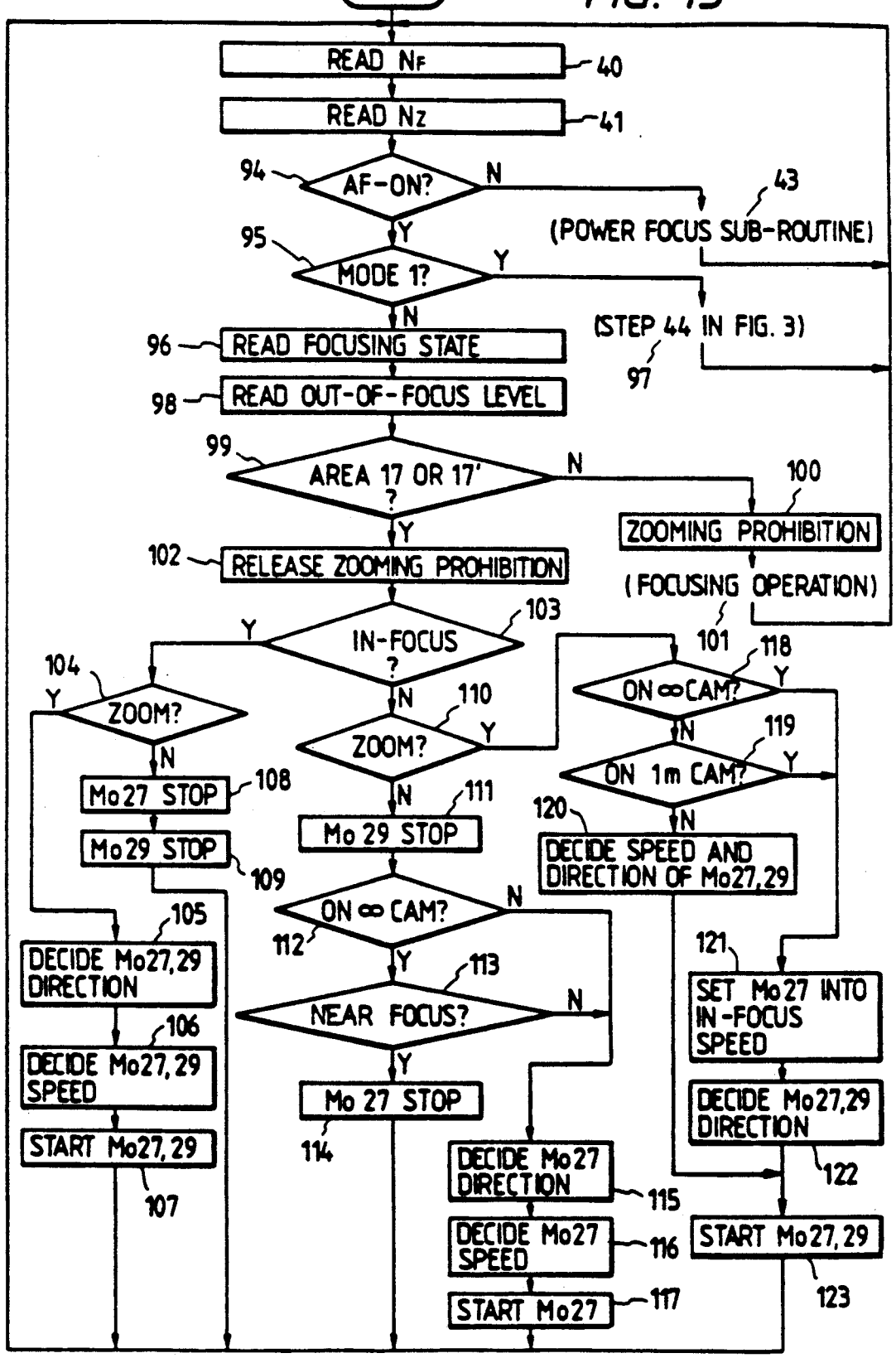

APPARATUS FOR CONTROLLING A ZOOMING OPTICAL DEVICE

This application is a division of application Ser. No. 07/540,267 filed Jun. 19, 1990, now U.S. Pat. No. 5,060,001.

BACKGROUND OF THE INVENTION

1. Field of the Invention

This invention relates to an optical apparatus having a lens group capable of accomplishing zooming action.

2. Related Background Art

Numerous optical designs are heretofore known for photo-taking lenses of variable focal length used in video cameras or the like, i.e., so-called zoom lenses. Particularly, a so-called four-group zoom lens in which a first lens group forward in the optic axis is a lens for focus adjustment, a second lens group is a lens group for magnification change a third lens group is a lens group for correction, the second and third lens group being operatively associated with each other in a predetermined relation to thereby accomplish a zooming operation, and a fourth lens group is a fixed lens group for imaging can be among said to be the most popular zoom lenses. In such four-group zoom lens, the first lens group for focus adjustment and the second and third lenses groups for varying the focal length function quite discretely from one another and therefore, it is not necessary to move the first lens group in response to zooming or move the second lens group for the purpose of focus adjustment. Thus, a lens barrel mechanism could be achieved by a relatively simple construction.

In contrast, there is known a zoom lens of so-called inner focus type in which a third lens group and subsequent lens groups provide a lens group for focus adjustment. In the case of the lens construction of the inner focus type, unlike the aforedescribed four-group zoom lens, the closest distance at which photographing is possible (in-focus is possible) is varied by the focal length when the lens group for focus adjustment is in its most axially forwardly moved position. Especially, there has been an advantage which cannot be achieved by the four-group zoom lens that at the wide end, in-focus becomes possible up to immediately before the lens. However, on the other hand, in such a zoom lens of the inner focus type, the lens group for focus adjustment lies rearwardly of the lens group for magnification change, and this leads to the characteristic that even if the object distance does not vary, the lens group for focus adjustment must be moved by zooming. This in turn has led to the disadvantage that the construction of the lens barrel mechanism becomes very complex. Therefore, such zoom lenses have heretofore been rarely put into practical use. In recent years, however, the development of an automatic focus adjusting device has put into practical use a system whereby the out-of-focus of the focal plane is directly evaluated and the position of the lens group for focus adjustment is controlled on the basis of this information. By the combination of the automatic focus adjusting device of this system and an inner focus lens, it becomes possible to make the position of the lens for focus adjustment a right position even if complicated lens barrel structure is not adopted.

FIGS. 5 to 8 of the accompanying drawings show several examples of the inner focus lens. In the type of FIG. 5, a first group lens 1 is fixed and the position of a second group lens 2 (solid line) is the position of the focal length (the wide end) on the wide side and the position of 2' (dots-and-dash line) is the position of the focal length (the telephoto end) on the telephoto side. Also, in this example, as in the conventional four-group zoom lens, a third group lens 3 is operatively associated with the second group lens in a predetermined relation, and the position of 3 (solid line) is the wide end position and the position of 3' (dots-and-dash line) is the telephoto end position. The second and third group lenses, like the lens barrel mechanism construction of the conventional four-group zoom lens, are operatively associated with each other, for example, by a cam ring. The reference numeral 4 designates a lens group for focus adjustment, and this lens group is constructed so as to be variable in position in the direction of the optic axis within a predetermined range as indicated by arrow.

The case of FIG. 6 is a case where the lens group corresponding to 3 in FIG. 5 is absent. Also, in this example, the lens group 4 is divided into a forward lens group 4A and a rearward lens group 4B, the forward lens group 4A being fixed, and the rearward lens group 4B being provided as a lens group for focus adjustment and being constructed so as to be variable in position in the direction of the optic axis within a predetermined range.

In the example shown in FIG. 7, first and fourth lens groups 1 and 4 are fixed and the position of a second lens group 2 is the wide end position and the position of 2' is the telephoto end position. Also, 3 is a lens for focus adjustment which is constructed so as to be variable in position in the direction of the optic axis within a predetermined range.

In the example shown in FIG. 8, a first group lens 1 is not fixed, but is operatively associated with a second group lens 2 which zooming. Here, 1 and 2 indicate the positions at the wide end, and 1' and 2' indicate the positions at the telephoto end. Also, a lens group for focus adjustment, as in the example shown in FIG. 6, is provided by the rearmost lens group 4B.

FIGS. 9 and 10 of the accompanying drawings show the relation between the position to be assumed by each lens group for focus adjustment in the inner focus lenses of FIGS. 5–8 and the focal length (the two-group lens position), FIG. 9 showing the relation in the case of the lens types of FIGS. 6–8, and FIG. 10 showing the relation in the case of the lens type of FIG. 5. In these figures, the zero position on the vertical axis is the position of the lens group for focus adjustment during the telephoto end ∞ focusing.

As is apparent in FIG. 9, in the case of the lens types shown in FIGS. 6–8, the close distance at which photographing is possible (in-focus is possible) at the wide end is 0 m, is about 1 m at the intermediate, and is of the order of 0.6 m at the telephoto end. Also, in the case of the lens type as shown in FIG. 5, the close distance is 0 m at the wide end, and becomes gradually longer and is about 1 m at the telephoto end. The optical systems of FIGS. 6–8, as can be understood from FIG. 9, are set so that when the lens group for zooming is moved from the wide angle end toward the telephoto end, the lens group for focusing may be moved from infinity toward the close distance and from the close distance toward infinity to thereby maintain in-focus.

FIG. 11 of the accompanying drawings shows the basic concept of an example of the automatic focus adjusting device of the aforedescribed type in which the out-of-focus of the focal plane is directly evaluated. In FIG. 11A, the reference numeral 17 designates the picture plane of a video camera or the like, and the reference numeral 18 denotes a distance measuring field therein which is an area for extracting a signal for effecting automatic focus adjustment. The reference numeral 19 designates the contrast pattern of an object to be photographed. FIG. 11B shows signal processing, and the luminance signal to the contrast pattern shown in (a) is as shown in (b). The luminance signal, when differentiated, is as shown in (c), and the absolute value thereof is as shown in (d). Let it be assumed that the height of (e) at which the absolute value has been sampled and held is A. When as shown in FIG. 11C, the position of the lens group for focus adjustment is plotted as the abscissa and the value of A is plotted as the ordinate, there is obtained a mountain-shaped signal and the lens group position B which is the peak is the in-focus lens position.

FIG. 12 of the accompanying drawings is a block construction diagram showing such automatic focus adjusting devices 12 and 13 combined together with the inner focus lens of FIG. 6 taken as an example. The reference numeral 12 designates a sensor, and the reference numeral 13 denotes an AF circuit for detecting the in-focus state by the output of the sensor 12. The reference numeral 14 designates a motor which is a drive source for driving means which makes the lens group 4B for focus adjustment variable in position in the direction of the optic axis.

Actually, however, in the construction as shown in FIG. 12, it is often difficult to normally obtain the in-focus state particularly during zooming. This is attributable to the fact that within the time required for the automatic focus adjusting devices 12, 13 to detect out-of-focus, judge whether this out-of-focus is far focus or near focus, and determine the direction of rotation of the motor 14, only the second group lens for magnification change is moved and deviates from the locus for continuing to be in focus to the inherent object distance shown in FIGS. 9 and 10.

In view of this point, the applicant's U.S. application Ser. No. 346,630 (filed on May 2, 1989), which issued as U.S. Pat. No. 4,920,369 on Apr. 24, 1990, has proposed a construction in which the interior of the map shown in FIGS. 9 and 10 wherein the abscissa represents the focal length and the ordinate represents the position of the lens group for focus adjustment is divided into a plurality of blocks (such as I, II, . . . ) as shown, for example, in FIG. 13 of the accompanying drawings. The direction and speed of the lens group for focus adjustment to be moved during zooming are determined, for example, from the differentiated value of the locus passing through the substantially central points of the respective blocks and the speed of movement of the second group lens 2, whereby even if the result of the distance measurement by the automatic focus adjusting device is not obtained, driving means for the lens group for zooming and driving means for the lens group for focus adjustment are driven at a time to thereby eliminate out-of-focus during zooming.

In an inner focus lens, when as shown in FIGS. 9 and 10, the lens group for focus adjustment is in its most axially forwardly moved position. The closest distance at which photographing is possible (in-focus is possible) differs depending on the focal length and therefore, if the selection of the focal length is wrong, in-focus cannot be achieved even for an object to which in-focus is possible.

As a solution to this problem, Japanese Laid-Open Patent Application No. 60-143310 discloses a system whereby whether the distance to an object judged by an automatic focus adjusting device is closer than the focusable closest distance in that focal length is judged by calculation. If so, a lens group for magnification change is forcibly zoomed toward the wide angle.

Such a construction is relatively easy in a case where as in an automatic focus adjusting device of the so-called deviation detecting type, the lens position which is in focus can be foreseen from the current position of the lens group for focus adjustment, but cannot be realized in a device which can merely discriminate between near focus and far focus or an automatic focus adjusting device which cannot accurately detect the distance to an object.

As another solution to the problem, it would occur to move the lens group for focus adjustment to the close distance end in that focal length during the out-of-focus on the close distance side, and when in-focus cannot be accomplished nevertheless, zoom the lens group for magnification change toward the wide angle.

However, this system would take a long time before is-focus in reached.

As a means for solving this problem as well, according to the applicant's U.S. application Ser. No. 487,276 (filed on Mar. 2, 1990), which was allowed on Dec. 31, 1990, and the issue fee having been paid but the patent number not yet assigned, use is made both of an actuator for driving the lens group for magnification change and an actuator for driving the lens group for focusing to thereby realize the operation of quickly reaching in-focus even when the photographer photographs an object at a distance shorter than the closest possible photographing distance conforming to each focal length.

In this case, more or less magnification change is involved to quickly obtain in-focus, but generally the closest possible photographing distance is several centimeters from immediately in front of the lens. The focal length is on the wide side and in this area, the rate of variation in the focal length occurring with a predetermined amount of movement of the lens group for magnification change is relatively small and therefore, it is considered that the magnification change occurring to quickly obtain in-focus does not bring about a great feeling of physical disorder.

By combining the inner focus lens as described above and a lens position control device together, in-focus can be quickly accomplished for objects from immediately before the lens to ∞ and in-focus can be maintained stably even during the zooming operation.

However, among the inner focus lens types, in the case of the example as shown in FIG. 9 wherein the focal length for which the closest distance at which photographing is possible is the shortest distance is not at the telephoto end (or the wide end) but is an intermediate focal length, some problems arises.

The first problem is that halfway through zooming, the object passes through an out-of-focus state. Even in the case of the characteristic as shown in FIG. 10, if on the shorter distance side than 1 m, zooming is effected from the wide side toward the telephoto side, in-focus cannot be maintained from halfway. In such case, on the talephoto side with this focal length for which in-focus cannot be maintained as the boundary, in-focus cannot be accomplished with any focal length and the characteristic is relatively easy to see. If zooming is effected from the in-focus state toward the wide side, it will be impossible that the object passes through an out-of-focus state halfway. In contrast, in the case of FIG. 9, even if for example, at the telephoto end, in-focus is effected to an object at a distance of 0.6 m, when zooming is effected toward the wide side, an out-of-focus state will occur in the focal length range shown by A in the figure. Accordingly, unless at the start of zooming the object distance, a distance at which in-focus can be accomplished with the total focal length is out-of-focus will also occur during the zooming from the telephoto side toward the wide side.

The second problem arises in a case where use is made of both the actuator for magnification change and the actuator for focusing according to the aforementioned U.S. application Ser. No. 487,276 (Japanese Patent Application No. 1-51726) and these actuators are driven at a time depending on the situation.

FIG. 14 of the accompanying drawings shows the position of the magnification changing lens on the abscissa in such a manner that the wide end position is 0 and the telephoto end position is 180 (these lens positions are detected by an encoder or the like). Also, on the ordinate, the position of the focusing lens group is shown by 0 to 210 (the position of this lens is likewise detected by some means) In the figure, the positional relation between the two lenses in the case of ∞ in-focus at the focal length of 50 on the abscissa is indicated by a point $P_1$. When from this state, focusing is to be effected on an object at a distance of 0 m immediately in front of the lens, the time required for focusing can be more shortened by the lens being moved in such a manner as $P_1 \rightarrow P_5 \rightarrow P_4 \rightarrow P_3 \rightarrow P_0$ than being moved in such a manner as $P_1 \rightarrow P_2 \rightarrow P_0$. That is, this effect is obtained because during the movement $P_5 \rightarrow P_3$, the actuator for magnification change and the actuator for focusing are driven at a time. In the case of FIG. 13, the closest distance for which in-focus is possible at all focal lengths is about 1.0 m. Also, the closest distance for which in-focus is possible at the telephoto end is about 0.5 m. Accordingly, if such movement as previously indicated by $P_1 \rightarrow P_0$ is effected when from a point $P_6$ at the telephoto end (in-focus to a distance intermediate of 0.5–1.0 m), the lens is focused on an object at a distance of 0 m immediately in front of the lens, the movement will become such as indicated by $P_6 \rightarrow P_7 \rightarrow P_8 \rightarrow P_0$, and it will be seen that between $P_6 \rightarrow P_8$, the in-focus distance halfway of focusing becomes longer than at the starting point of time (the in-focus distance at $P_6$). Such movement is very unnatural, and when in the combination with an automatic focus adjusting device, out-of-focus becomes more remarkable between $P_6 \rightarrow P_8$, it is feared that the judgment of direction will reverse intermediately of $P_6 \rightarrow P_8$ and will return to $P_6$.

SUMMARY OF THE INVENTION

One aspect of the invention is to provide an optical apparatus for controlling, in a zoom optical system of the inner focus type, a focusing lens so as not to be positioned in an area wherein in-focus cannot be continuously maintained to an object at a close distance, during the movement of a magnification changing lens from the telephoto side to the wide side.

BRIEF DESCRIPTION OF THE DRAWINGS

FIGS. 3, comprising FIGS. 3A and 3B, and 4 are flow charts representing a first embodiment.

FIG. 14 is a graph for illustrating problems peculiar to the prior art.

FIG. 15 is a flow chart representing a second embodiment.

DESCRIPTION OF THE PREFERRED EMBODIMENTS

Figure 1:
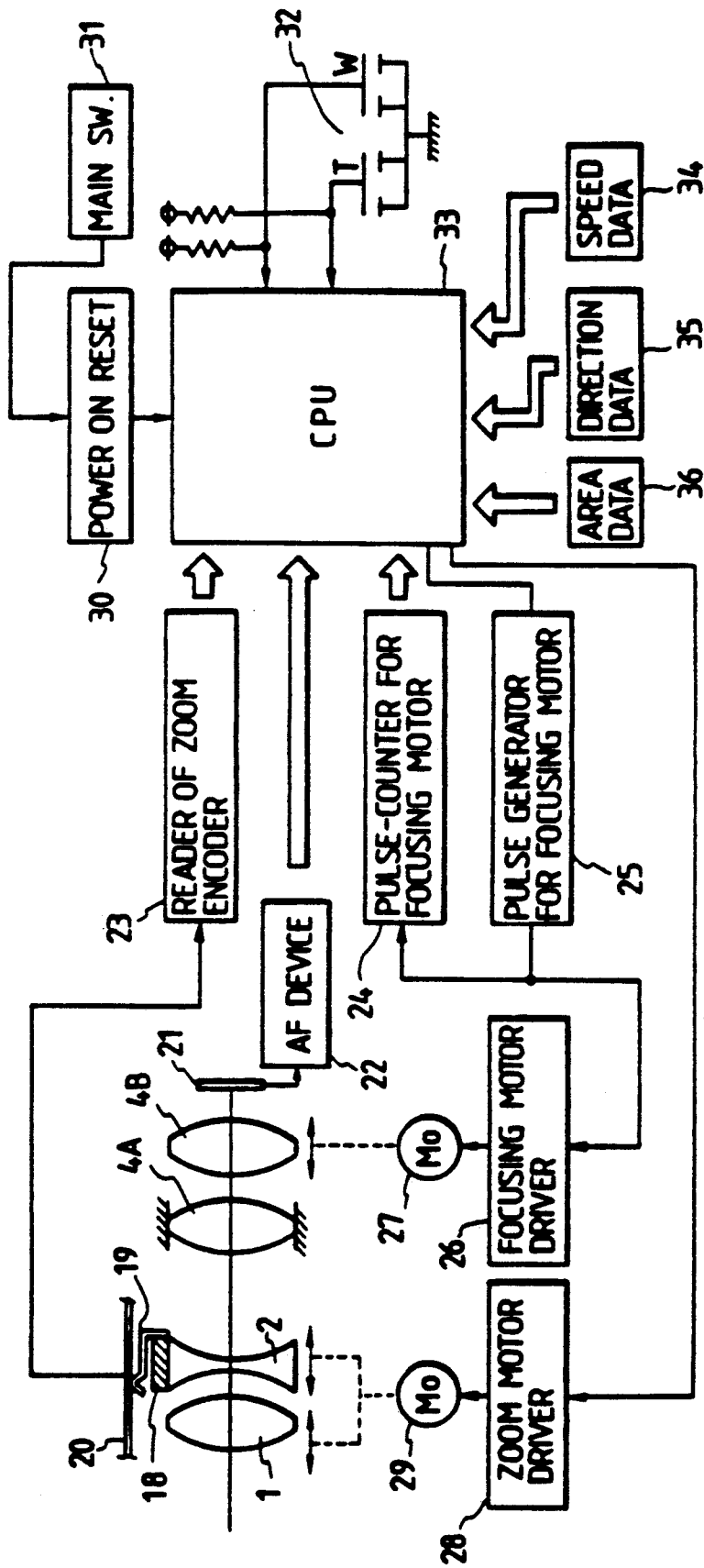
FIG. 1 is a block diagram of a lens position controller according to an embodiment of the present invention.
Figure 8:
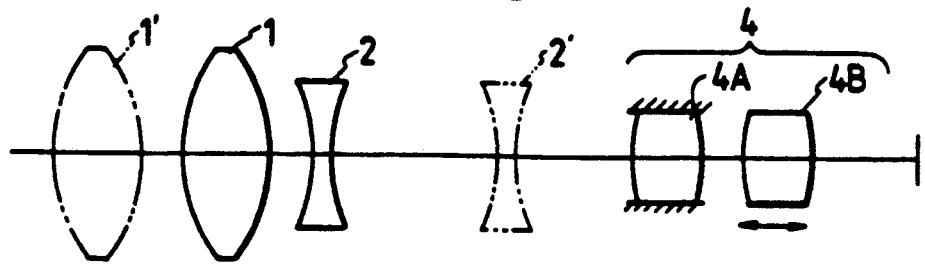
Figure 9:
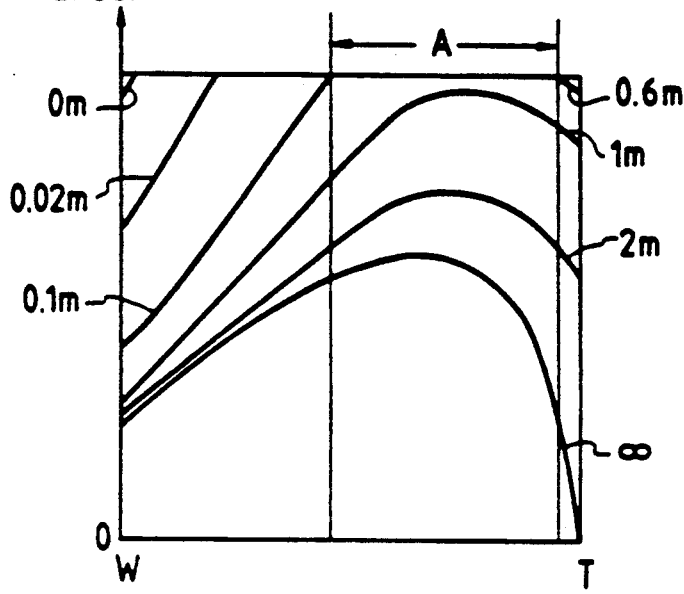
FIGS. 9 and 10 are graphs showing the optical characteristics of the inner focus lenses.
Figure 10:
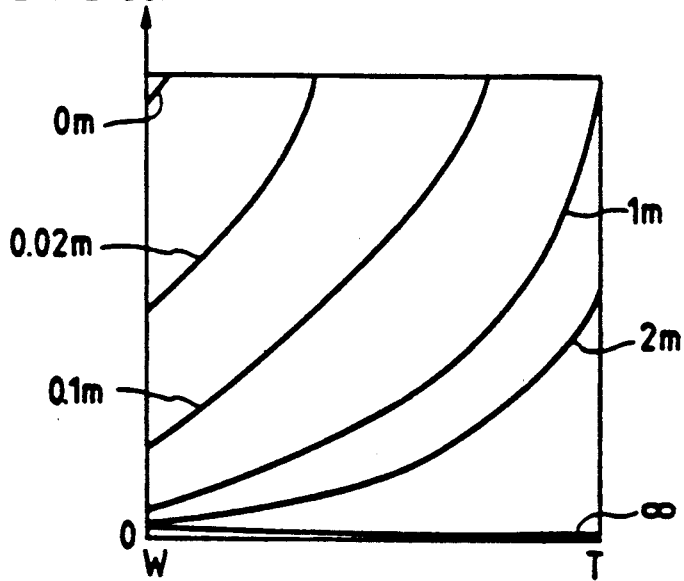
Figure 11A:
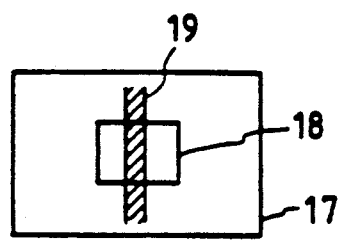
FIGS. 11A, 11B, and 11C illustrate an example of an AF device.
Figure 11B:
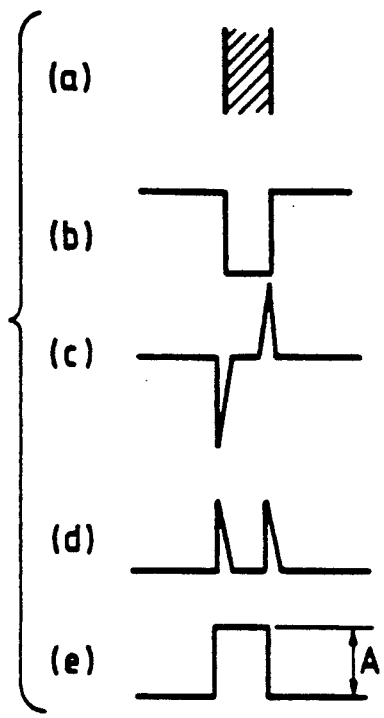
Figure 11C:
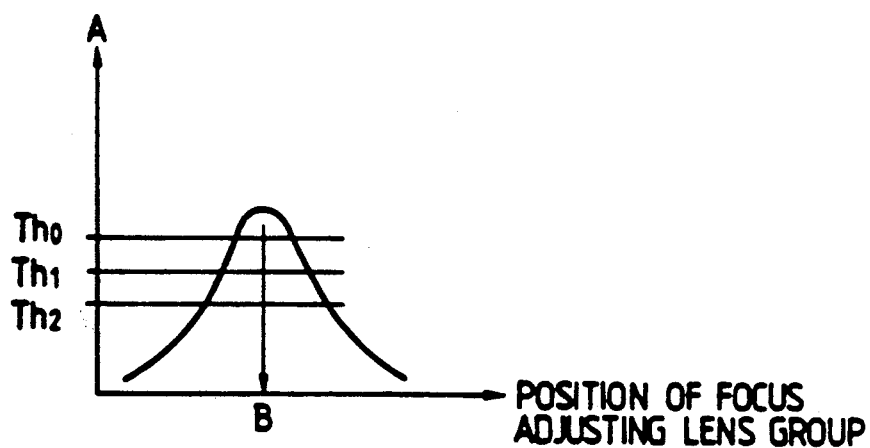
Figure 12:
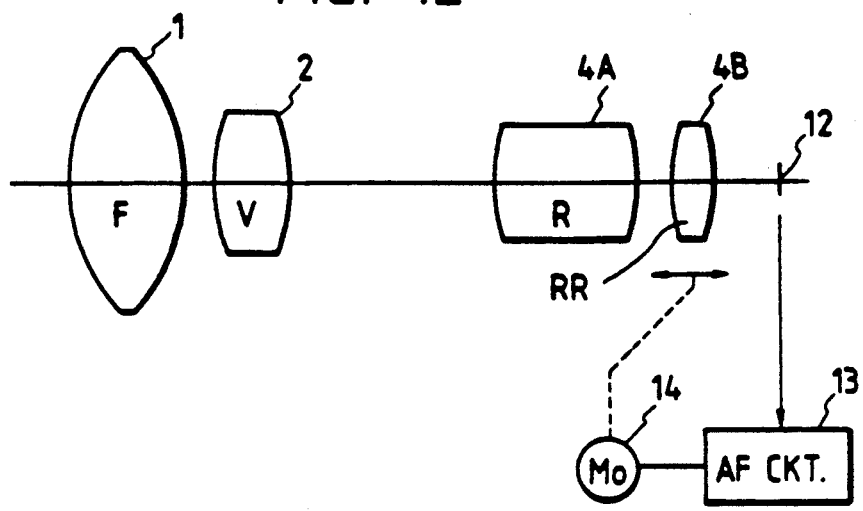
FIG. 12 is an illustration showing a state in which a lens is moved by the AF device.
Figure 13:
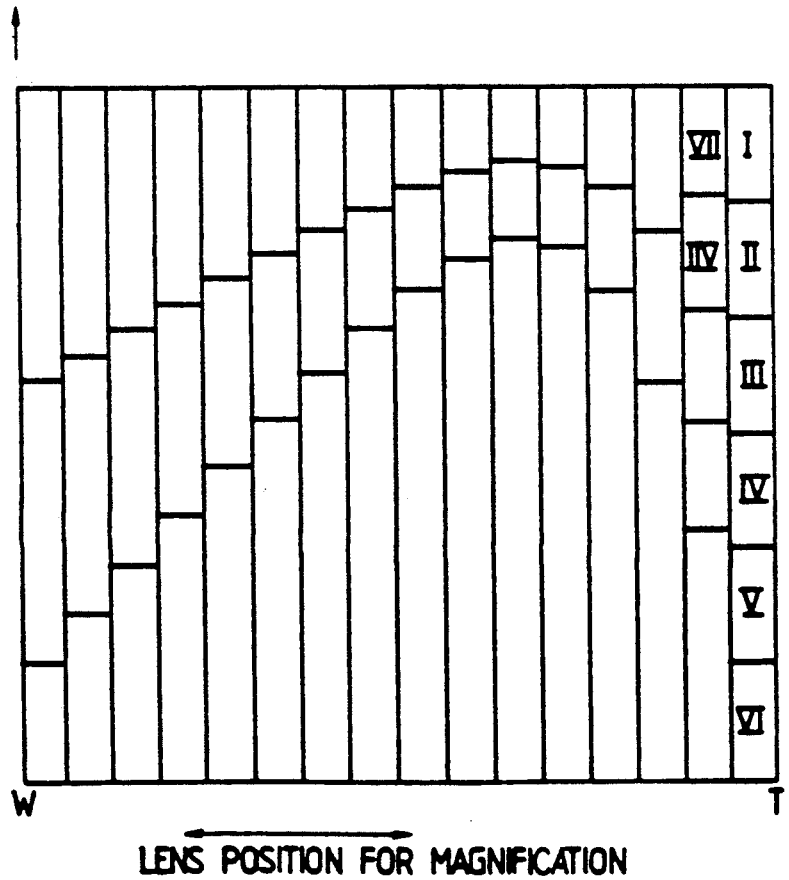
FIG. 13 illustrates an example of area division.

FIGS. 1 and 2 show a first embodiment of the present invention. FIG. 1 is a diagram showing the block construction of the present invention. Here, the lens optical system, as its optical type, is shown by the construction already described in convention with FIG. 8. In FIG. 1, the reference numeral 18 designates the lens frame of a lens group 2 for magnification change, the reference numeral 19 denotes an encoder brush attached to the lens frame 18, and the reference numeral 20 designates an encoder base plate printed with a gray code or a variable resistor for the brush 19 to slide thereon and detect the absolute position of the lens group 2. The reference numeral 21 denotes an image pickup device such as a CCD, the reference numeral 22 designates the aforementioned AF device, the reference numeral 23 denotes a zoom encoder reading circuit, and the reference numeral 24 designates a focusing motor driving pulse counting circuit. The reference numeral 25 denotes a focusing motor driving pulse output circuit which drives a step motor 27 through a focusing motor driver 26, thereby driving a focusing lens group 4B. With the movement of this lens group, the position of the lens group 4B is read into a CPU 33 by the aforementioned pulse counting circuit 24. The reference numeral 28 designates a zoom motor driver, and the reference numeral 29 denotes a zoom motor for driving a first group lens and a second group lens. In the CPU 33, use is made of information from speed data 34, direction data 35 and area data 36 memorized to effect the lens position control during zooming by the aforedescribed area division. The reference numeral 31 designates a main switch, the reference numeral 32 denotes a zoom switch, and the reference numeral 30 designates a power on reset circuit. In the power on reset, the lens group 4B is moved to a reset position immediately after power on to detect the absolute position of the lens group 4B by a step motor driving pulse, and in this position, the pulse is set to a predetermined value and also, a reset operation such as detecting the speed of the zoom motor 29 is performed. A switch, not shown, for detecting the reset position is required during the movement of the lens group 4B to the above-mentioned reset position.

FIG. 2 shows the concept of the first embodiment of the present invention. In the first embodiment of the present invention, design is made such that the closest distance determined by a point $P_{23}$ and at which photographing is possible, on the telephoto side from a focal length of 1 m which is the longest distance, does not come into an axially forwardly moved area (the portion indicated by hatching) from this 1 m in-focus locus. By thus providing a prohibition area in the rightward upper portion of the map, the aforedescribed problem is solved. That is, during the zooming from the telephoto side toward the wide side, it never happens that out-of-focus occurs halfway of the zooming.

Also, when the lens is to be focused on an object at a distance of 0 m from a point $P_{26}$, the lens is moved on the cam locus by 1 m between the point $P_{26}$ to the point $P_{23}$, whereby it neither happens that the focus is shaken toward the long distance side intermediately of the focusing. The loci in the map which are passed during the focusing from points $P_{10}$, $P_{13}$, $P_{16}$, $P_{19}$, $P_{22}$, $P_{24}$ and $P_{26}$ to the immediate front of the lens are as shown in Table 1 below.

TABLE 1

| Start point | Route | 0 m in-focus point |
|---|---|---|
| $P_{10}$ | → $P_{11}$ → $P_{12}$ → | $P_0$ |
| $P_{13}$ | → $P_{14}$ → $P_{15}$ → | " |
| $P_{16}$ | → $P_{17}$ → $P_{18}$ → | " |
| $P_{19}$ | → $P_{20}$ → $P_{21}$ → | " |
| $P_{22}$ | → $P_{23}$ → | " |
| $P_{24}$ | → $P_{25}$   $P_{23}$ → | " |
| $P_{26}$ | $P_{23}$ → | " |

Here, the movements indicated by " ➔ " are not straight movements in the map, but are the movements substantially along the 1 m cam locus which links $P_{23}$ and $P_{26}$ together. Also, in this embodiment, in the areas 17 and 17' between ∞ and 1 m, focusing at each focal length is effected by only the motor 27 of FIG. 1, and in the area 16, focusing is effected by the motors 27 and 29 of FIG. 1 being driven at a time, and such selection of the motors used by area is shown in detail in CFO 6658 US, U.S. patent application Ser. No. 07/487,276, filed on Mar. 2, 1990, and allowed on Dec. 31, 1990, with the issue fee having been paid but the patent number not yet assigned, (Japanese Patent Application No. 1-51726).

Figure 2A:
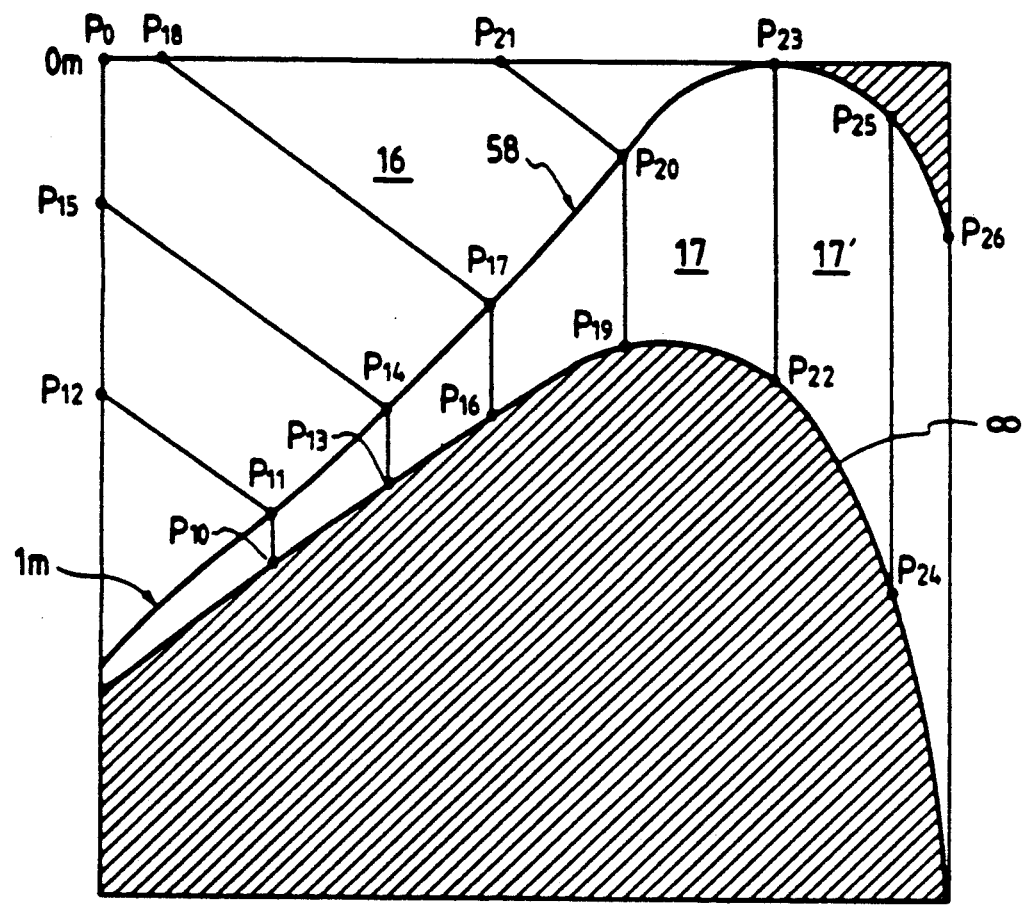
FIGS. 2A and 2B illustrate the principle of the present invention.
Figure 2B:
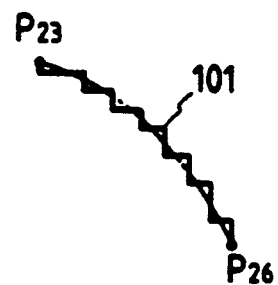

That is, in the first embodiment of the present invention, when focusing is effected from a point in the area 17' more adjacent to the telephoto side than the focal length of $P_{23}$ to an object at a close distance, the 1 m cam locus is used as a stopper at the most axially forwardly moved position. For the memorization of the cam locus between $P_{23}$ and $P_{26}$, there is actually conceivable a method of making the cam locus into a staircase-like shape as shown in FIG. 2B in conformity with the resolving power of a zoom encoder, or a method of approximating the cam locus to a high-degree equation.

Figures 3, 3A:
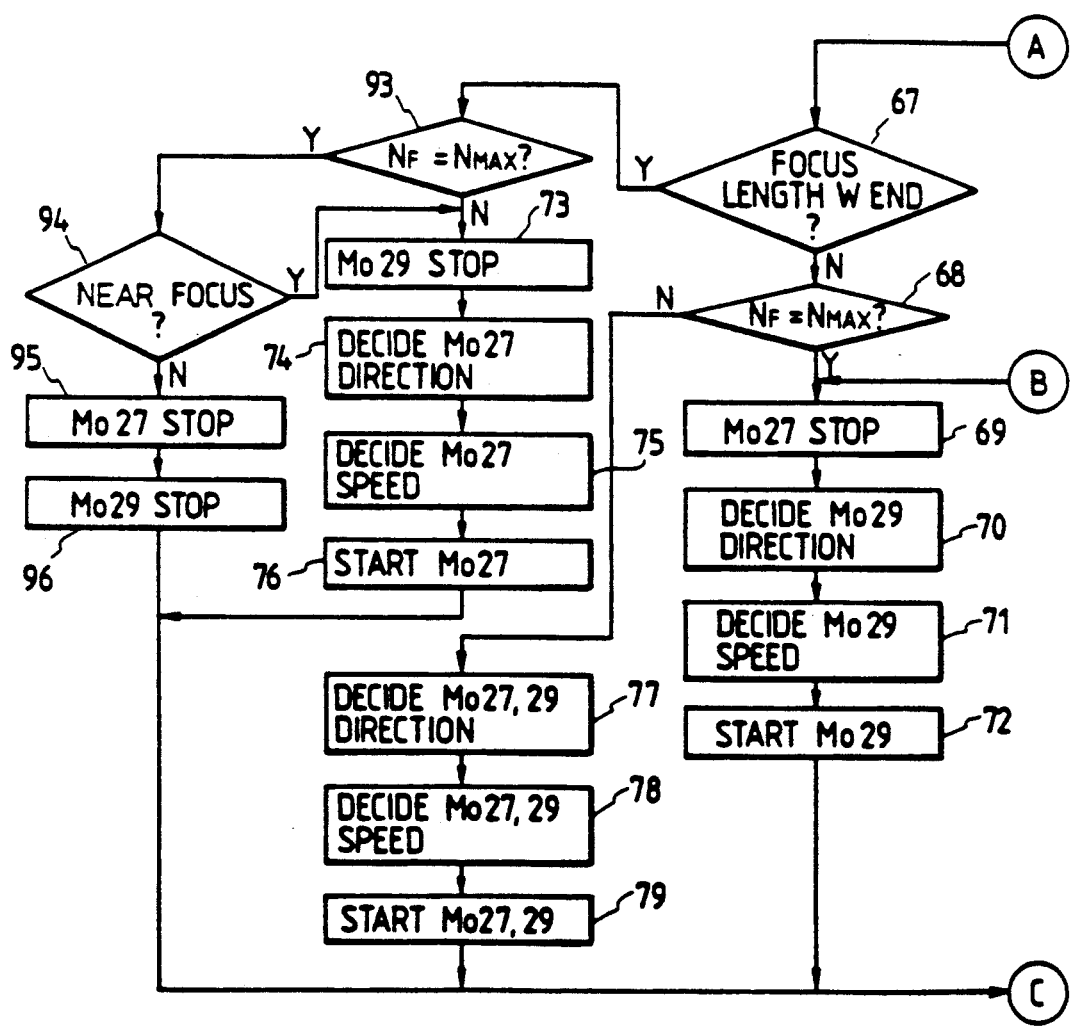
Figure 3B:
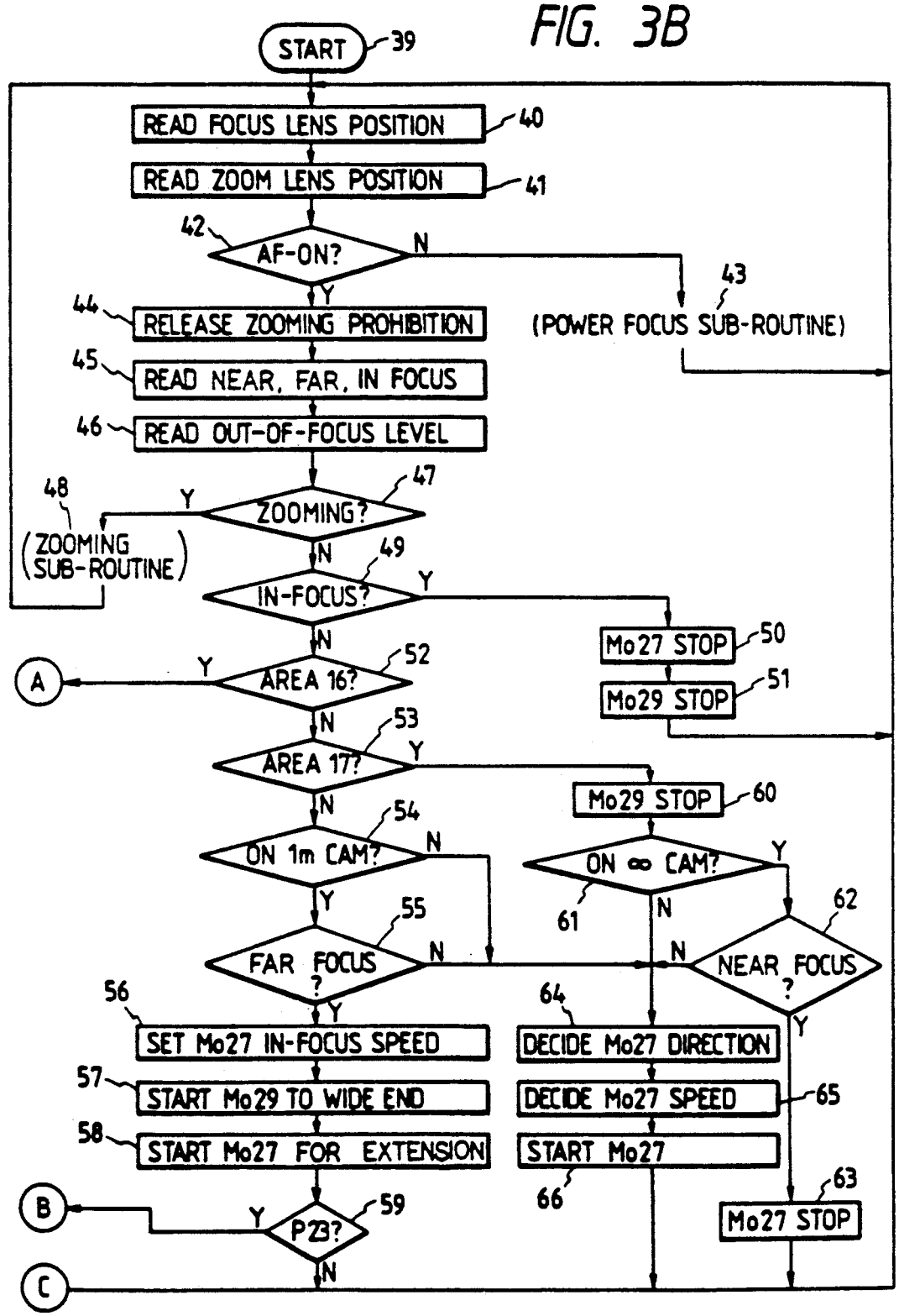
Figure 5:
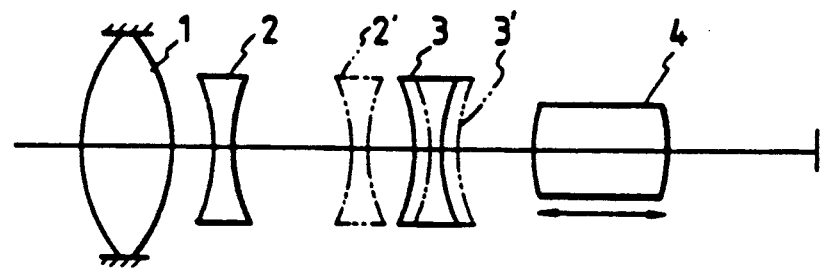
FIGS. 5, 6, 7 and 8 illustrate the optical constructions of inner focus lenses.
Figure 6:
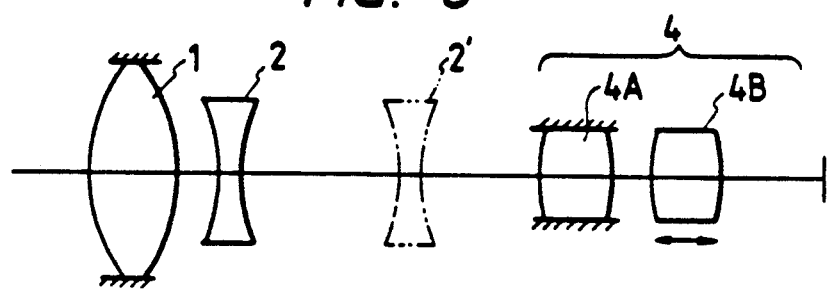
Figure 7:
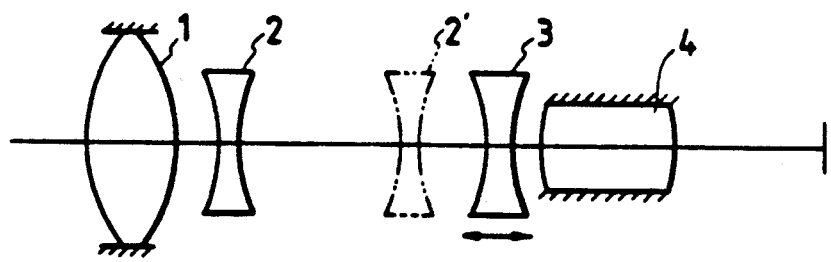

FIG. 3 shows the flow chart in the CPU in the first embodiment of the present invention. At a step 39, the program is started. At steps 40 and 41, the values on the ordinate and abscissa shown in FIG. 2A are read. If AF is not operating at a step 42, the power focus sub-routine of a step 43 is entered. Although the power focus sub-routine is not described in detail herein, the driving of the zoom motor 29 is prohibited therein. At a step 44, the zooming prohibited during AF-OFF is released. At a step 45, the result of the discrimination between in-focus and out-of-focus, and in the case of out-of-focus, the result of the discrimination between near focus and far focus, are read from the AF device shown in FIG. 1, and in the case of out-of-focus, the level of out-of-focus is read at a step 46.

At a step 47, whether the zoom switch 32 shown in FIG. 1 has been operated is discriminated. During the zooming operation, the zooming sub-routine 48 is entered. The zooming sub-routine will be described later with reference to FIG. 4. If the zoom switch 32 is not being operated, at a step 49, in-focus or out-of-focus is judged from the result read at the step 45. In the case of in-focus, the motor 27 of FIG. 1 for driving the focusing lens (hereinafter referred to as Mo 27) is stopped at a step 50. The motor 29 (Mo 29) for driving the magnification changing lens is also stopped at a step 51.

In the case of out-of-focus, whether the point in the map indicating the positional relation between the two lenses is in the area 16 of FIG. 2A, i.e., the area in which the object within a close distance of 1 m is at the in-focus distance, is discriminated. If said point is not in the area 16, whether said point is in the area 17 is discriminated at a step 53. That is, if said point is in the area 16, the program shifts to a step 67, and if said point is in the area 17, the program shifts to a step 60, and if said point is in the area 17', the program shifts to a step 54.

If said point is in the area 16, at a step 67, whether the focal length is at the wide end is discriminated. If the focal length is at the wide end, at a step 93, whether $N_F$ is $N_{MAX}$ which is the close stopper is discriminated, and if $N_F \neq N_{MAX}$, at a step 73, the zoom motor is stopped, and at steps 74 and 75, the direction and speed of rotation of Mo 27 are determined from the AF information read at the steps 45 and 46. At a step 76, Mo 27 is driven. If at the step 93, it is judged that $N_F = N_{MAX}$, it shows that said point is at the point $P_0$ in the map of FIG. 2. If at a step 94, the result of the discrimination of the direction is far focus, both Mo 27 and Mo 29 are stopped at steps 95 and 96. In the case of near focus, the step 73 and the subsequent same routine as that described above are followed.

Also, if said point is in the area 16 of FIG. 2 and the focal length is not at the wide end, at a step 68, whether $N_F$ has reached the value $N_{MAX}$ which is the close stopper is discriminated. If $N_F \neq N_{MAX}$, both Mo 27 and Mo 29 are used to effect the focusing operation. Accordingly, at a step 77, the directions of rotation of Mo 27 and Mo 29 are determined on the basis of the information from the AF device read at the steps 45 and 46, and at a step 78, the speeds of rotation of Mo 27 and Mo 29 are determined, and at a step 79, both motors are driven.

If at the step 68, it is judged that $N_F = N_{MAX}$, the focusing operation by Mo 27 cannot be effected. Consequently, at a step 69, Mo 27 is stopped, and at steps 70 and 71, the direction and speed of rotation of Mo 29 are determined, and at a step 72, Mo 29 is driven.

Description will now be made of a case where said point is in the area 17'. At a step 54, whether the point in the map coincides with the 1 m cam locus (which is the close stopper in the area 17') linking the points $P_{23}$ and $P_{26}$ of FIG. 2 together is judged. If said point coincides with this 1 m cam locus, at a step 55, whether the result of the judgment of the AF device read at the step 45 is far focus is discriminated. If said result is far focus, there is the possibility of in-focus being obtained if the focusing lens group is axially moved to the rightward upper area indicated by hatching in FIG. 2, but when $N_F$ becomes $N_F = N_{MAX}$ and yet said result is far focus, even if as previously described, Mo 29 is driven from here and this focusing is effected, the lens will be focused to a longer distance until the point $P_{23}$ is exceeded. Accordingly, at steps 56, 57 and 58 which are the features of the present invention, the operation of following the 1 m cam locus and bringing said point to the point $P_{23}$ is performed. When in this case, the speed at which Mo 29 is driven at the step 57 is considered to be a constant speed, the area of said point is decided upon from the area data 36 of FIG. 1 on the basis of the zoom lens position information read at the step 41, and then, with this decided area as the base, data for following the 1 m cam locus and arriving at the point $P_{23}$ is read from direction data 35 and speed data 34. This shows that even if the result of the judgment is far focus, 1 m in-focus is maintained until the point $P_{23}$ is arrived at, and it is for the above-described reason that at the step 56, the speed of Mo 27 was defined as the speed during in-focus. At a step 59, whether the point $P_{23}$ has been arrived at is judged, and if it has been arrived at, the program is transferred to the focusing operation of a step 69 and subsequent steps using Mo 29. If the judgment at the step 55 is not far focus or the judgment at the step 54 is not reached 1 m, the same control as that of the area 17 takes place. If at the step 53, it is judged that said point is in the area 17, at a step 60, Mo 29 is stopped, and at a step 61, whether said point is coincident with the ∞ cam locus is judged. If at the step 61, it is judged that said point is coincident with the ∞ cam locus, Mo 27 is stopped at a step 63 if at a step 62, near focus is judged. If far focus is judged, as when at the step 61, said point was not coincident with the cam locus, at steps 64-66, the focusing operation is performed by Mo 27.

The zooming sub-routine shown at the step 48 of FIG. 3 will now be described with reference to FIG. 4. In the flow chart of FIG. 4, when the wide end is arrived at during the zooming from the telephoto side to the wide side (hereinafter referred to as T→W) and when the telephoto end is arrived at during the zooming from the wide side to the telephoto side (hereinafter referred to as W→T), it is necessary to stop Mo 29, but the flow of this portion is omitted herein.

At a step 81, whether the switch operation of the zoom switch 32 of FIG. 1 is T→W or W→T is known. At steps 82 and 83, the area is determined by the area data 36 of FIG. 1 on the basis of the values of $N_F$ and $N_Z$ read at the steps 40 and 41 of FIG. 3, and on the basis of this area, the direction and speed of rotation of Mo 27 are determined from the direction data 35 and speed data 35. It is to be understood that the speed of rotation of Mo 29 is a predetermined constant speed. At a step 84, whether the point in the map is in the area 17' is discriminated. If said point is in the area 17', at a step 85, whether said point is coincident with the 1 m cam locus is discriminated, and if it is coincident with the 1 m cam locus, at a step 90, whether the focus is far focus is judged. Even if the focus is far focus, it is necessary that the 1 m cam locus be followed until the point $P_{23}$ is arrived at and therefore, at a step 91, the speed of Mo 27 is set so. In the case of near focus or in-focus, it is not necessary to change the values set at the steps 82 and 83 and therefore, on the basis of that information, Mo 27 and Mo 29 are driven at a step 92.

When said point is in the areas 16 and 17, at a step 86, whether $N_F = N_{MAX}$ is judged. If the close end is arrived at (if $N_F = N_{MAX}$), at a step 87, Mo 27 is stopped and at a step 88, Mo 29 is driven. If $N_F \neq N_{MAX}$, at a step 89, Mo 27 and Mo 29 are driven at a time.

Second Embodiment

In the first embodiment described above, the rightward upper portion of FIG. 2 indicated by hatching has been defined as the prohibition area and the point in the map has not entered this area. However, if this area is used, the closest distance at which photographing is possible becomes 0.6 m although it has been 1 m for example at the telephoto end, and this means an enlarged area in which photographing is possible. So, a second embodiment of the present invention presents a method whereby instead of performing the focusing operation using Mo 27 and Mo 29 for focusing the lens on objects from immediately in front of the lens to ∞ for any focal length as shown in the first embodiment, the focusing operation is performed by the use of only Mo 27 and zooming is prohibited when said point is in the area 16 and the rightward upper portion of FIG. 2 indicated by hatching.

FIG. 15 shows a flow chart of this second embodiment.

At a step 93, the program is started. At steps 40 and 41, $N_F$ and $N_Z$ are read, and at a step 94, whether AF is ON is judged. If AF is OFF, at a step 43, the power focus sub-routine (detailed description of which is avoided here) is entered. At a step 95, whether the mode is Mode 1 is judged. It is to be understood here that Mode 1 refers to the first embodiment. Accordingly, if the result of the judgment at the step 95 is Mode 1, at a step 97, shift is made to the step 44 and subsequent steps of the flow of FIG. 3. Also, it is to be understood that the second embodiment is not Mode 1. At steps 96 and 98, the information from the AF device is read as in the first embodiment. At a step 99, whether the point in the map is in the area 17 or 17', that is, whether the lens is focused to the distance between ∞ and 1 m, is judged. If not so, that is, if said point is in the area 16 and the rightward upper area of FIG. 2 indicated by hatching, at a step 100, zooming is prohibited, and at a step 101, the focusing operation using Mo 27 alone is performed. The substance of the step 101 is not described in detail here. It is to be understood that when the lens is in focus to the distance between ∞ and 1 m, if at a step 102, zooming prohibition is released and the zooming operation is performed, Mo 29 will be driven in a predetermined direction. At a step 103, whether the lens is in focus is judged, and at steps 104 and 110, judgment of the zooming operation is done.

If the lens is in focus and the zooming operation does not take place, at a step 108, Mo 27 is stopped and at a step 109, Mo 29 is stopped. Also, if the lens is in focus and the zooming operation is performed, the area data is determined from the area data by $N_F$ and $N_Z$, and the speed of Mo 27 during in-focus memorized for each area is read from the speed data 34 and the direction of rotation of Mo 27 is read from the direction data 35 by the direction of the zooming operation, and the speed and direction of rotation of Mo 29 are determined by the substance of the operation of the zoom switch 32. It is to be understood that these determinations of the direction and speed are done at steps 105 and 106 and Mo 27 and Mo 29 are driven at a step 107.

If the lens is out of focus and the zooming operation is not performed, at a step 111, Mo 29 is stopped and at a step 112, whether said point is coincident with the ∞ cam locus is judged. If said point is on the ∞ cam locus and the result of the judgment is near focus, at a step 114, Mo 27 is stopped. On the other hand, if said point is on the ∞ cam locus and the result of the judgment is far focus or said point is not on the ∞ cam locus, at steps 115-117, the ordinary focusing by Mo 27 is effected. If the lens is out of focus and the zooming operation is performed, said point is prevented from entering the zooming prohibition area (16 and the rightward upper portion indicated by hatching) outside the area 17 or 17' during zooming. Accordingly, when at steps 118 and 119, said point is on the ∞ cam or the 1 m cam locus, even if near focus or far focus is judged, the data during in-focus is selected as the speed data (a step 121) and at a step 122, the directions of rotation of Mo 27 and Mo 29 are determined, whereafter at a step 123, Mo 27 and Mo 29 are driven. That is, design is made such that when the point in the map is on the ∞ cam or the 1 m cam locus, it is moved on the ∞ cam or the 1 m cam. However, if said point is on the ∞ cam and far focus is judged and if said point is on the 1 m cam and near focus is judged, it is conceivably better to select far focus compensation speed and near focus compensation speed, respectively, as speed data and get out of the ∞ cam or the 1 m cam. In such case, when said point coincides with the ∞ cam or the 1 m cam, the direction of out-of-focus can be discriminated thereafter, and then the speed of Mo 27 can be determined.

If said point coincides with neither of the ∞ cam and the 1 m cam, at a step 120, the speeds and directions of rotation of Mo 27 and Mo 29 are determined on the basis of the substance of the operation of the zooming operation switch, the information from the AF device, and $N_F$ and $N_Z$.

Third Embodiment

Besides the first and second embodiments, as a method more based on the operator's free will, there is conceived a method whereby when said point is in the rightward upper area of FIG. 2 indicated by hatching, area display is given in the viewfinder or a warning sound is produced to thereby warn that out-of-focus will occur intermediately if the zooming operation is performed.

As has hitherto been described, the illustrated embodiments have the effect of preventing any inconvenience occurring during the focusing operation and the zooming operation by making the area in which in-focus cannot be continuously maintained to an object at a close distance during the driving from the telephoto end to the wide end (the rightward upper portion of FIG. 2 indicated by hatching) an inrush prohibiting area, a zooming prohibiting area or a warning area.

What is claimed is:

1. An optical apparatus, comprising:
    (a) a first lens for effecting a magnification change;
    (b) a second lens provided more adjacent to the focal plane than said first lens for effecting focusing and compensation in the magnification change;
    (c) driving means for moving said first and said second lens along the optic axis thereof;
    (d) detecting means for detecting the positions of said first lens and second lens; and
    (e) control means for controlling said second lens so as not to move it to a first area in which continuous in-focus cannot be maintained to an object at a close distance, during the movement of said first lens form a telephoto side to a wide side, said control means controlling said second lens so as not to move it to a second are in which in-focus cannot be obtained in the position of an infinity side of said second lens.

2. An apparatus according to claim 1, further comprising second control means for controlling, on the basis of position information obtained from said detecting means, the movement of said second lens so as to maintain the in-focus state when said first lens is moved.

3. An apparatus according to claim 2, wherein said second control means controls the movement of said second lens by prestored information.

4. An apparatus according to claim 2, further comprising third control means for moving said second lens into the in-focus state, said third control means being capable of discriminating between the near focus state and the far focus state during an out-of-focus condition.

5. An apparatus according to claim 4, wherein said control means controls the movement of said second lens with the information of the focus state found by said third control means being added thereto.

6. An apparatus according to claim 2, wherein said control means controls the movement of said second lens by prestored information.

7. An apparatus according to claim 6, wherein said control means controls the speed of movement of said second lens.

8. An optical apparatus, comprising:
    (a) a first lens for effecting a magnification change;
    (b) a second lens provided more adjacent to the focal plane than said first lens for effecting focusing and compensation in the magnification change;
    (c) first driving means for moving said first lens along the optic axis thereof;
    (d) second driving means for moving said second lens along the optical axis thereof;
    (e) first control means for controlling said second lens so as not to move it to an area in which continuous in-focus cannot be maintained to an object at a close distance, during the movement of said first lens from a telephoto side to a wide side; and
    (f) second control means for moving said second lens into the in-focus state except for movement into said area, said second control means forcedly moving said first lens in the wide direction when the object is at a close distance position.

9. An apparatus according to claim 8, further comprising third control means for controlling the movement of said second lens so as to maintain the in-focus state when said first lens is moved.

10. An apparatus according to claim 8, wherein said first control means controls the movement of said second lens by prestored information.

11. An apparatus according to claim 10, wherein said first control means controls the speed of movement of said second lens.

12. An apparatus according to claim 8, wherein said second control means moves both said first lens and said second lens.

* * * * *

UNITED STATES PATENT AND TRADEMARK OFFICE
CERTIFICATE OF CORRECTION

PATENT NO. : 5,249,010
DATED : September 28, 1993
INVENTOR(S) : NAOYA KANEDA

It is certified that error appears in the above-indentified patent and that said Letters Patent is hereby corrected as shown below:

COLUMN 1:

Line 20, "change" should read --change,--;
    Line 21, "group" should read --groups--;
    Line 25, "among said to be" should read --said to be among--;
    Line 26, "lens," should read --lenses,--; and
    Line 28, "lenses" should read --lens--.

COLUMN 2:

Line 36, "which" should read --while--.

COLUMN 3:

Line 59, "a" should read --one--.

UNITED STATES PATENT AND TRADEMARK OFFICE
CERTIFICATE OF CORRECTION

PATENT NO. : 5,249,010
DATED : September 28, 1993
INVENTOR(S) : NAOYA KANEDA

It is certified that error appears in the above-indentified patent and that said Letters Patent is hereby corrected as shown below:

COLUMN 4:

Line 24, "is-focus" should read --in-focus--;
Line 51, "before" should read --in front of--;
Line 58, "arises." should read --arise.--; and
Line 65, "talephoto" should read --telephoto--.

COLUMN 5:

Line 9, "distance," should read --distance is--;
Line 10, "length is" should read --length,--; and
Line 49, "halfway of" should read --halfway through--.

COLUMN 6:

Line 25, "convention" should read --connection--.

UNITED STATES PATENT AND TRADEMARK OFFICE
CERTIFICATE OF CORRECTION

PATENT NO. : 5,249,010
DATED : September 28, 1993
INVENTOR(S) : NAOYA KANEDA

It is certified that error appears in the above-indentified patent and that said Letters Patent is hereby corrected as shown below:

COLUMN 7:

Line 7, "of" should read --through--;
Line 12, "neither" should read --never--; and
Lines 25 and 25:

"$P_{24} \rightarrow P_{25} \quad P_{23} \rightarrow$
$P_{26} \quad\quad P_{23} \rightarrow$"

should read

--$P_{24} \rightarrow P_{25} \rightarrow P_{23} \rightarrow$
$P_{26} \rightarrow P_{23} \rightarrow$--

COLUMN 9:

Line 44, "data et." should read --data 34.--.

Signed and Sealed this

Twenty-fourth Day of May, 1994

BRUCE LEHMAN

*Attest:*

*Attesting Officer*     *Commissioner of Patents and Trademarks*